INVENTOR
EDWIN P. MEINERS, JR.
BY
ATTORNEYS

Oct. 22, 1957     E. P. MEINERS, JR     2,810,898
REMOVING NORMAL MOVEOUT FROM SEISMIC TRACES

Filed Dec. 28, 1954     2 Sheets—Sheet 2

INVENTOR
EDWIN P. MEINERS, JR.
BY
ATTORNEYS

United States Patent Office 2,810,898
Patented Oct. 22, 1957

2,810,898

REMOVING NORMAL MOVEOUT FROM SEISMIC TRACES

Edwin P. Meiners, Jr., Whittier, Calif., assignor to California Research Corporation, San Francisco, Calif., a corporation of Delaware Application December 28, 1954, Serial No. 478,145

5 Claims. (Cl. 340—15)

This invention relates in general to seismic prospecting and relates more specifically to methods of and apparatus for analyzing data obtained in such prospecting.

In the reflection method of seismic prospecting, energy from an artificial seismic disturbance is reflected from various subsurface strata back to seismic wave detectors at or near the surface of the earth which convert the detected movement into corresponding output signals. The output signals are amplified and then recorded for subsequent analysis. Usually, the seismic wave detectors are spaced different distances from the location of the seismic disturbance so that energy reflected from a given reflecting horizon arrives at the different detectors at different times, resulting in time shifts of corresponding signal portions of the different seismic traces. These time shifts which are caused by the different spacings of the detectors are commonly referred to as normal moveout and they tend to obscure alignments of corresponding signal portions across the traces, thus making it difficult to accurately determine the presence of a reflecting horizon. Additionally, where the seismic traces are to be combined or mixed into a single trace in which the signal portions of the mixed traces reinforce each other and the extraneous energy or noise portions tend to randomize or cancel, the presence in the mixed traces of the normal moveout time variations prevents accurate alignment of corresponding signal portions across the traces, thus resulting in a less than optimum reinforcement of the corresponding signal portions in the resultant mixed trace.

The normal moveout time varies in magnitude during the seismic disturbance, being largest immediately after the disturbance, when the differences in distances of the travel paths to the different detectors for energy from a given reflecting horizon are largest, and decreasing in magnitude as these differences decrease for successively deeper reflecting horizons. The exact manner in which the normal moveout time varies as a function of the time after the disturbance will, of course, depend on the spacings of the different detectors and the particular velocity function obtaining in the surveyed area. It is customary to compute the normal moveout time for a given reflecting horizon and a given detector, either on the basis of a known velocity function or from field data obtained in the field with split spreads. In the latter case the normal moveout for a particular reflection is given as one half of the sum of the moveouts of the outside traces, representing equal offsets but opposite in direction.

Heretofore, numerous methods and apparatus have been proposed for removing the normal moveout time variations from seismic traces, but none has been particularly successful. With the advent of reproducible recording in seismic prospecting, a number of methods have been proposed for removing normal moveout by effecting relative shifts in the positions of the recording or reproducing heads relative to the recording medium to produce relative time shifts in the recorded or reproduced traces. In one of such methods, the reproducibly recorded traces are reproduced a plurality of times and the reproducing heads are shifted different amounts for each reproduction to produce normal moveout compensation for a given reflection on each reproduction. However, this method has the disadvantage that it requires a reproduction of the traces, and the consequent shifting of the reproducing heads, for every reflection of interest, thus rendering the operation very time consuming from a record processing standpoint. This method has the further disadvantage that if the reproduced traces are to be mixed, only that signal portion of each trace corresponding to the reflection for which normal moveout has been removed will produce optimum reinforcement when mixed.

An additional method sometimes utilized to remove normal moveout is to continuously move each of the recording or reproducing heads relative to the recording medium during either recording or reproducing of the traces to continuously vary the time sequences of the traces in an attempt to provide the desired correction. However, the problem is complicated by the fact that the required normal moveout correction varies nonlinearly with respect to the time elapsing after the disturbance, the required correction being largest immediately after the disturbance, when the differences in the distances of the travel paths to the different detectors for a given reflection are largest, and decreasing nonlinearly with time as these differences decrease. An additional complicating consideration is that the instantaneous values of the required correction vary nonlinearly from detector to detector, particularly at the start of the record when the required correction is large.

One of the approaches utilized in this continuous correction method is to mount the reproducing heads at spaced-apart points along a member which overlies the recording medium and which is pivoted at one end for programmed, nonlinear movement relative to the time axis of the recording medium. However, this method has the disadvantage that the different reproducing heads are spaced along the member at distances proportional to the squares of the distances of the different detectors from the shot point, thus resulting in the reproducing heads corresponding to the detectors closest to the shot point being located at relatively closely spaced points near the fixed end of the member, and the reproducing heads corresponding to the detectors farthest from the shot point being located at relatively widely spaced points near the movable end of the member. This is disadvantageous when it is considered that the reproducing heads nearest the fixed end of the member are capable of relatively little movement unless the member is of almost prohibitively great length. This type of a system has the further disadvantage that, owing to the square law relationship existing between the detector spacing and reproducing head spacing, it is difficult to accommodate changes in detector spacing. An additional disadvantage of this system is that it introduces the largest error at the early part of the seismic record when the required correction is also largest, thus resulting in a maximum error in the moveout correction operation.

Broadly, the present invention contemplates methods of and apparatus for correcting a plurality of seismic traces for the effects of normal moveout time variations in which the introduced correction varies nonlinearly along the traces with respect to time and nonlinearly from trace to trace. More particularly, the invention contemplates introducing the desired correction by programming the movement of the reproducing or recording heads in accordance with the movement of a resilient member which has a deforming force of variable magnitude applied thereto during recording or reproduction. The resilient member is suitably shaped so that its deformation in response to the deforming force varies nonlinearly from head to head, corresponding to the required nonlinear correction from trace to trace, and varies nonlinearly throughout the duration of the seismic traces, corresponding to the required nonlinear variations in the moveout correction along each trace. The heads are connected to different points along the length of the member to vary the positions of the different heads relative to each other and to the recording medium during the moveout correction operation. The reproducing or recording heads are connected to the resilient member at points which are spaced in direct proportion to the distances of the different detectors from the shot point, so that variations in the spacings of the detectors may be readily accommodated by corresponding proportional variations in the connections of the heads to the resilient member.

It is, therefore, an object of this invention to provide improved methods of and apparatus for correcting a plurality of seismic traces for normal moveout time variations.

It is an additional object of the present invention to provide methods of and apparatus for correcting a plurality of seismic detector signals for normal moveout time variations, in which the correction varies nonlinearly both throughout the duration of the traces and from trace to trace.

It is a further object of this invention to provide methods of and apparatus for correcting a plurality of reproducibly recorded seismic traces for normal moveout time variations in which the reproducing means associated with the reproducible recording medium are disposed at spaced-apart points along a resilient member which is deformable relative to the recording medium.

It is an additional object of the present invention to provide methods of and apparatus for correcting a plurality of reproducibly recorded seismic traces for nonlinear normal moveout time variations in which the reproducing heads associated with the recording medium are disposed along the length of a resilient member which is nonlinearly deformed along its length during reproduction of the traces to produce nonlinear variations in the time sequences of reproduced traces.

It is an additional object of the present invention to provide methods of and apparatus for correcting a plurality of reproducibly recorded seismic traces for nonlinear normal moveout time variations in which the reproducing heads associated with the recording medium are disposed along the length of a resilient member which is nonlinearly deformed along its length during reproduction of the traces to produce nonlinear variations in the time sequences of reproduced traces, the distances between the different heads along the resilient member being directly proportional to the distances between the different seismic wave detectors which produce the different traces.

It is an additional object of the present invention to provide methods of and apparatus for correcting a plurality of reproducibly recorded seismic traces for nonlinear normal moveout time variations in which the reproducing heads associated with the recording medium are disposed along the length of a resilient member which has a deformation along its length during reproduction of the traces which is nonlinear both along the traces and from trace to trace to produce nonlinear variations in the time sequences of the reproduced traces.

Objects and advantages other than those set forth above will be apparent from the following description when read in connection with the accompanying drawing, in which.

Figure 1:
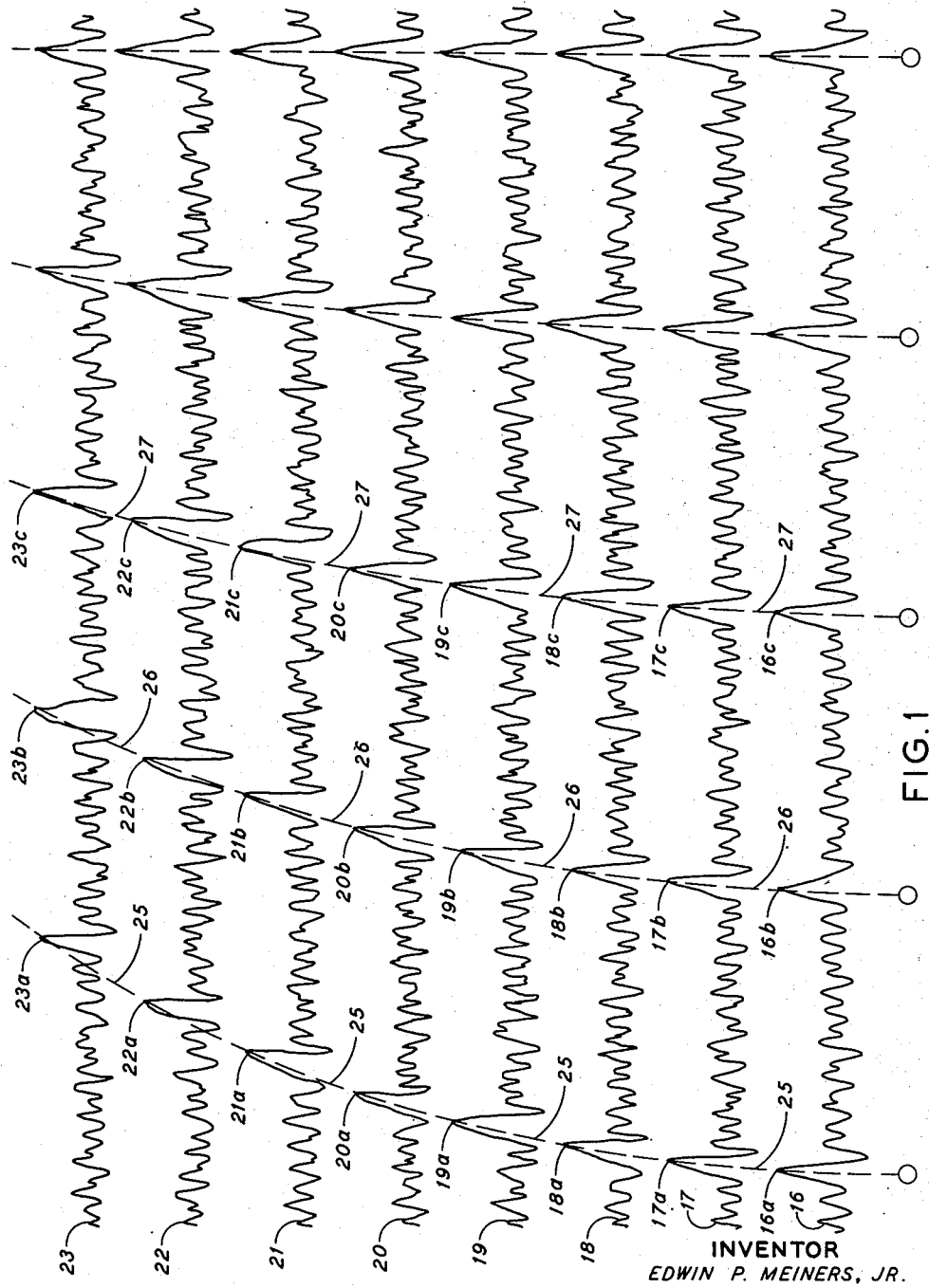
Fig. 1 is a series of curves illustrating the effect of normal moveout time variations on a representative group of seismic detector signals.

To aid in understanding the considerations involved in normal moveout time variation corrections and the application of this invention to this problem, Fig. 1 illustrates a series of curves representing a plurality of seismic traces obtained in a representative seismic prospecting operation. The different traces are identified as traces 16, 17, 18, 19, 20, 21, 22 and 23, and each curve represents the output of a seismic detector plotted as a function of time. It is assumed that the detectors producing the traces are spaced at equal distances along a line through the shot point, the detector corresponding to trace 16 being located nearest the shot point and the detector corresponding to trace 23 being located farthest from the shot point.

In practice, it will be understood that in the split spread method of seismic prospecting, another series of detectors similar to those producing traces 16 through 23 will be located in a line on the other side of the shot point to produce a corresponding plurality of traces, which, together with traces 16 through 23, give complete subterranean coverage as the shot point is moved along the line being surveyed. For the sake of simplicity, these other traces are not shown, but it will be understood that these traces produced by these detectors would be symmetrical with respect to traces 16 through 23 and would be substantially the mirror image of these latter traces.

Traces 16 through 23 each have similar first peak portions 16a, 17a, 18a, 19a, 20a, 21a, 22a and 23a representing reflections of energy from a given shallow reflecting horizon. It will be noted that the positions of these first peaks are shifted relative to each other along the time axis of the record, these time shifts corresponding to the normal moveout times for this reflection. It will be further noted that the time shifts between the peaks of the different traces follow a nonlinear pattern, as shown by the dotted line 25 running through these peaks.

Each of the seismic traces also has a second peak 16b, 17b, 18b, 19b, 20b 21b, 22b and 23b at a subsequent time in the record, corresponding to receipt by the different detectors of energy from a second reflecting horizon. These peaks are shifted relative to each other along the time axis in a nonlinear fashion, although the total time shift between peaks 16b and 23b is not as great as it is for the first reflections represented by peaks 16a through 23a. Dotted line 26 running through peaks 16b through 23b illustrates that the normal moveout correction for this particular reflection is also nonlinear and different from the moveout correction represented by dotted line 25 for peaks 16a through 23a. A third similar reflection is shown in each of the traces by peaks 16c through 23c, and dotted line 27 joining these peaks has less slope than either of the preceding normal moveout function lines 25 and 26, but normal moveout function 27 is also nonlinear. Additional subsequent common peaks in the records and the corresponding dotted line therethrough indicating the normal moveout function are illustrated in traces 16 through 23 to show that the normal moveout time variations decrease as the record progresses until the normal moveout variations are substantially zero when the differences in the distances of the travel paths to the different detectors are negligible.

Although, for the purposes of clarity of illustration, the seismic record illustrated in Fig. 1 has been idealized to show fairly pronounced peaks with a minimum of extraneous energy or noise, it will be understood that, in practice, considerable noise is usually present in seismic traces, and that visual alignment of the traces is usually quite difficult.

Figure 2:
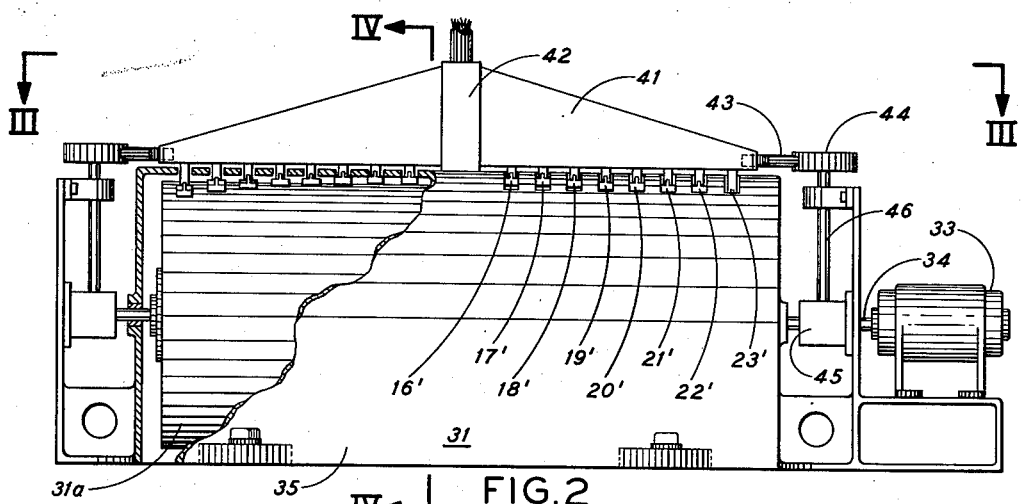
Fig. 2 is a side view, partly in section, of one embodiment of a reproducible recording device for carrying out the present invention.
Figure 3:
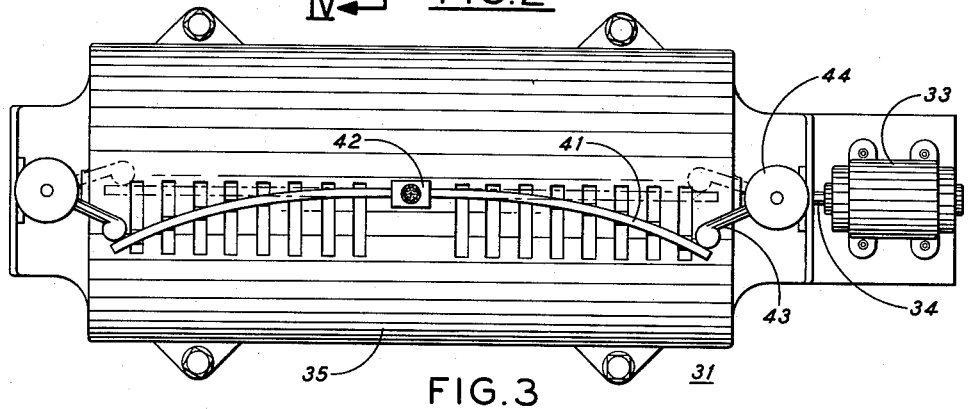
Fig. 3 is a top view of the apparatus illustrated in Fig. 2.
Figure 4:
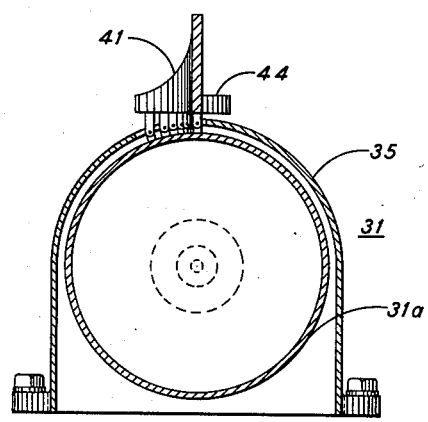
Fig. 4 is a sectional view taken along plane IV—IV of Fig. 2.

Assuming that a seismic record similar to that illustrated in Fig. 1 has been produced by a plurality of seismic detectors arranged in the manner described, the methods and apparatus of this invention may be utilized to accurately remove the normal moveout time variations from such a record in the following manner. In Figs. 2, 3 and 4, reference numeral 31 designates generally a reproducible recording device on which the seismic traces may be recorded and then reproduced repeatedly and at will. Recording device 31 may comprise a rotor mounted inside a housing 35 and on which is disposed a recording medium in the form of a layer of magnetizable material 31a. The rotor on which recording medium 31a is disposed is driven by a motor 33 through a shaft 34.

Recorder 31 is further provided with a plurality of recording and/or reproducing heads 16', 17', 18', 19', 20', 21', 22', 23' having electrical connections to the different seismic detectors. These heads overlie recording medium 31a and are adapted to record and/or reproduce information on and from medium 31a. Each of heads 16' through 23' is movable in a slot in the recorder housing 35 a limited distance about the periphery of recording medium 31a to effect time shifts in the relative positions of these recording heads. Each of the recording heads is connected to a resilient or deformable bar member 41 whose movement is programmed in accordance with the normal moveout function obtaining in the area under survey. Member 41 may be disposed at a distance from the recording device and be connected to the different recording or reproducing heads through cables and pulleys, or member 41 may, as shown, have the recording or reproducing heads connected directly thereto and be disposed on recorder frame 35 to overlying medium 31a. Member 41 may be of any suitable material, such as stiff rubber or spring steel, capable of undergoing the required deformation with sufficient resiliency. One end of bar 41 is fixed to a mounting post 42 disposed in the center of recorder 31. The distance from the outer edge of post 42 to head 16' is preferably proportional to the distance between the shot point and the first detector, and the spacing between the heads 16' through 23' is similarly proportional to the spacings between the different detectors. The other end of member 41 has applied thereto a deforming force which varies in magnitude during recording of the seismic traces to vary the configuration of member 41 during such recording. In the embodiment illustrated, the deforming force is applied by a camming finger or arm 43 secured to a disc 44 driven by motor 33 through a gearing 45 and a shaft 46. Different moveout functions may be accommodated in resilient member 41 either through variations in the configuration of member 41, or, preferably, through variations in the point along the length of member 41 at which the deforming force is applied. It will be understood that for a resilient member of given length, the maximum curvature will occur when the deforming force is applied at the free end, and that correspondingly less curvature will occur as the point of application of the deforming force is moved toward the fixed end. In the connection, the reproducing or recording heads should be mounted between the fixed end and the point of application of the deforming force to obtain the desired programmed movement.

Heads 16' through 23' are suitably secured at spaced-apart points along member 41 and are movable therewith so that the heads move about the periphery of recording medium 31a when deformable bar member 41 moves to effect time shifts in the positions of the different heads relative to the time axis of recording medium 31a. The stiffness of member 41 and the force applied thereto by arm 43 are such as to overcome any tendency of the heads to bend or jam in the slots, thus insuring that the heads move readily in accordance with the desired programming. The heads are secured to member 41 in a manner which permits them to accurately track their associated channels on recording medium 31a without misalignment. Variations in the spacings of the detectors may be accommodated by utilizing members 41 of different lengths for the different detector spacings, so that the curvature of the selected member 41 corresponds to the moveout function for the particular detector spacing under consideration.

In operation, assume that seismic traces 16 through 23 have been recorded on medium 31a and that the moveout correction is to be accomplished during reproduction of the traces. As stated above, for the particular seismic surveying operation illustrated, another group of detectors would normally be utilized and their outputs would be similarly recorded on recorder 31 symmetrically about supporting member 42. These latter heads are also connected at spaced-apart points along a deformable member similar to member 41 whose movement is programmed by a camming finger driven by motor 33. At the start of the reproducing operation, deformable members 41 would be deformed by cam fingers 43 to cause members 41 to assume the position shown in Fig. 2, with the curvature of members 41 at this point, as best shown in Fig. 3, corresponding to the curve of line 25 running through the first peaks 16a through 23a of seismic traces 16 through 23.

The operation of the invention may be more readily understood by considering that, in Fig. 1, the cylindrical surface of recording medium 31a is developed out into a plane surface with traces 16 through 23 recorded thereon and with curve 25, running through peaks 17a through 23a, corresponding to the curvature of resilient member 41 at the start of the reproducing operation. Each of heads 16' through 23' would thus overlie the associated peaks 16a through 23a of the respective seismic traces. Motor 33 may thereupon be started to start rotation of medium 31a under heads 16' through 23'. As motor 33 drives recording medium 31a, camming finger 43 is also driven through gearing 45, shaft 46 and disc 44 to decrease the deforming force applied to resilient member 41. Resilient member 41 thereupon starts to move to return to its neutral position, thus causing the heads 16' through 23' to move relative to each other and relative to the recording medium.

The movement of finger 43 and the configuration of resilient member 41 are so designed that when recording medium 31a has rotated to the corresponding peaks 16b through 23b, resilient member 41 has the configuration or shape shown by dotted curve 26 running through peaks 16b through 23b. Heads 16' through 23' are thus accurately positioned relative to each other and to the recording medium 31a so that each of these heads overlies the portion of recording medium 31a containing the associated peaks 16b, 17b, 18b, 19b, 20b, 21b, 22b, and 23b. As recording medium 31a continues to rotate, finger 43 continues to decrease the deforming force applied to resilient member 41, with consequent decrease in the curvature of this member. Thus, resilient member 41 assumes the shape shown by dotted curve 27 when peaks 16c through 23c appear on recording medium 31a, so that heads 16' through 23' exactly overlie the associated peaks 16c through 23c of the respective traces. The operation continues as the deforming force applied to resilient member 41 is decreased to reduce the curvature of resilient member 41 as the normal moveout function decreases during the duration of the seismic traces.

Although, for the purposes of illustration, separate, definite moveout functions 25, 26 and 27 have been illustrated, it will be understood that, in practice, the moveout function will vary continuously throughout the duration of the seismic record and that the configuration of resilient member 41 will correspondingly continuously vary during reproduction of the seismic traces so that the configuring of member 41 at any instant has the value required to position heads 16' through 23' at the correct positions relative to each other and relative to recording medium 31a to provide a continuous normal moveout correction.

Traces reproduced through heads 16' through 23', with normal moveout time variations removed, may be recorded on another recording medium or, alternatively, combined or mixed to produce a composite trace in which each of the reflections is emphasized relative to the extraneous energy or noise.

As stated above, the shape of resilient member 41 and the point at which the deforming force is applied thereto may be varied to accommodate different normal moveout functions, and the member shape and point of application of the deforming force may be determined from a consideration of the mechanics involved in the deflection of a cantilever beam in response to a deforming force. In general, it can be stated that, in the case of a simple beam which is fixed at one end and which tapers to a point at its free end, if the deforming force is applied at the free end, the resulting curvature of the member may closely approximate the desired normal moveout function, particularly if the curvature is not too pronounced. However, if additional curvature is required, the length of the tapered member should be increased and the deforming force applied at a point spaced from the free end, thus resulting in, effectively, a resilient member which approximates a trapezoid along its length. It can be shown that this latter member has the characteristic that if its maximum deflection is the same as that of a simple tapered beam of the same length, its deflection at any point along its length will always be greater than the deflection for the corresponding point along the length of the simple tapered beam. Thus, the trapezoidal shaped beam may be utilized to provide more curvature for a given length than a simple tapered beam.

In this connection, if it is not possible to exactly match the beam configuration to the normal moveout function throughout the duration of the seismic record, the emphasis should be placed on obtaining maximum correlation at the start of the seismic record when the required normal moveout time corrections are substantially larger than they are later in the record. Thus, on a percentage of error basis, an error of 50 percent in the introduced correction near the end of the seismic record, where the total required correction may be only 2 milliseconds, will not be very serious, whereas, the same percentage of error near the start of the record, where the required correction may be, say, 50 milliseconds, will result in an appreciable error in the corrected traces.

It will be seen that this invention provides novel methods and apparatus for removing normal moveout time variations from a plurality of seismic traces which permits the reproducing heads to be spaced along the resilient member at distances directly proportional to the distances between the different seismic wave detectors, so that variations in the detector spacings may be readily accommodated by proportional variations in the positions of the heads along the resilient member. If the detector spacings vary from record to record and it is desired to process a number of such records rapidly, it may be preferable to locate the resilient deformable member at a distance from the recording medium, rather than have it as a part of the recorder housing itself, as in Figs. 2, 3 and 4, and connect the heads to points along the member through a cable and pulley arrangement. Changes in detector spacing can then be easily accommodated by changing the points along the resilient member at which the different cables are connected, thus facilitating changes in the programming of the different heads and permitting the use of a single resilient member for a plurality of different moveout functions.

Although but a few embodiments of the present invention have been illustrated and described, it will be apparent to those skilled in the art that various changes and modifications may be made therein without departing from the spirit of the invention or the scope of the appended claims.

I claim:

1. Apparatus for removing the effects of normal moveout on the relative times of occurrence of corresponding signal portions of a plurality of seismic detector traces comprising a reproducible recording medium for recording said traces, a plurality of reproducing heads movable relative to said medium for reproducing said traces, a deformable member having a free end to which a deforming force is applied and a fixed end, said deformable member being nonlinearly deformable along its length in response to said deforming force, means connecting said reproducing heads at spaced-apart points along the length of said member, and means for varying the magnitude of said deforming force applied to said free end of said member during reproduction of said traces to nonlinearly vary the positions of said reproducing heads relative to each other and to said recording medium in accordance with the normal moveout function to produce substantial time coincidence of said corresponding signal portions of said reproduced traces.

2. Apparatus for removing the effects of normal moveout on the relative times of occurrence of corresponding signal portions of a plurality of seismic detector traces produced by a plurality of spaced seismic wave detectors comprising a reproducible recording medium for recording said traces, a plurality of reproducing heads movable relative to said medium for reproducing said traces, a deformable member having a free end to which a deforming force is applied and a fixed end, said member being nonlinearly deformable along its length in response to said deforming force, means connecting said reproducing heads at spaced-apart points along the length of said member, the spacings between said points being directly proportional to the spacings between said detectors, and means for varying the magnitude of said deforming force applied to said free end of said member during reproduction of said traces to nonlinearly vary the positions of said reproducing heads relative to each other and to said recording medium in accordance with the normal moveout function to produce substantial time coincidence of said corresponding signal portions of said reproduced traces.

3. Apparatus for removing the effect of normal moveout on the relative times of occurrence of corresponding signal portions of a plurality of seismic detector traces comprising a reproducible recording medium for recording said traces, a plurality of reproducing heads movable relative to said medium for reproducing said traces, a deformable member extending transversely of said recording medium and having a free end to which a deforming force is applied and a fixed end, said member being nonlinearly deformable along its length in response to said deforming force, means connecting said reproducing heads at spaced-apart points along the length of said member, and means for varying the magnitude of said deforming force applied to said free end of said member during reproduction of said traces to nonlinearly vary the positions of said reproducing heads relative to each other and to said recording medium in accordance with the normal moveout function to produce substantial time coincidence of said corresponding signal portions of said reproduced traces.

4. Apparatus for removing the effects of normal moveout on the relative times of occurrence of corresponding signal portions of a plurality of seismic detector traces produced by a plurality of spaced seismic wave detectors comprising a reproducible recording medium for recording said traces, a plurality of reproducing heads movable relative to said medium for reproducing said traces, a deformable member having a free end to which a deforming force is applied and a fixed end, said mounting member being nonlinearly deformable along its length in response to said deforming force, cable means connecting said reproducing heads to spaced-apart points along the length of said member, the spacings of said points along said member being directly proportional to the spacings of said detectors, and means for varying the magnitude of said deforming force applied to said free end of said member during reproduction of said traces to nonlinearly vary the positions of said reproducing heads relative to each other and to said recording medium in accordance with the normal moveout function to produce substantial time coincidence of said corresponding signal portions of said reproduced traces.

5. Apparatus for removing the effects of normal moveout on the relative times of occurrence of corresponding signal portions of a plurality of seismic detector traces comprising a reproducible recording medium, a plurality of recording heads movable relative to said medium for recording said signals, a deformable member having a free end to which a deforming force is applied and a fixed end, said mounting member being nonlinearly deformable along its length in response to said deforming force, means connecting said recording heads at spaced-apart points along the length of said member, and means for varying the magnitude of said deforming force applied to said free end of said member during recording of said traces to nonlinearly vary the positions of said recording heads relative to each other and to said recording medium in accordance with the normal moveout function to produce substantial time coincidence of said corresponding signal portions of the recorded traces.

References Cited in the file of this patent

UNITED STATES PATENTS

| | | |
|---|---|---|
| 2,243,730 | Ellis | May 27, 1941 |
| 2,427,421 | Rieber | Sept. 16, 1947 |
| 2,440,971 | Palmer | May 4, 1948 |

FOREIGN PATENTS

| | | |
|---|---|---|
| 750,936 | Germany | Feb. 3, 1945 |